(12) United States Patent
Webb

(10) Patent No.: US 9,471,086 B1
(45) Date of Patent: Oct. 18, 2016

(54) SAFETY FEATURES FOR SWITCH HANDLE FOR PIGGABLE PIPELINE CONNECTOR

(71) Applicant: Brian Webb, Owasso, OK (US)

(72) Inventor: Brian Webb, Owasso, OK (US)

( * ) Notice: Subject to any disclaimer, the term of this patent is extended or adjusted under 35 U.S.C. 154(b) by 0 days.

(21) Appl. No.: 14/982,414

(22) Filed: Dec. 29, 2015

(51) Int. Cl.
  *G05G 1/08* (2006.01)
  *G05G 5/04* (2006.01)
  *G05G 1/04* (2006.01)
  *F16L 55/26* (2006.01)

(52) U.S. Cl.
  CPC ............... *G05G 5/04* (2013.01); *F16L 55/26* (2013.01); *G05G 1/04* (2013.01)

(58) Field of Classification Search
  CPC ............ G05G 5/04; G05G 1/04; G05G 5/08; G05G 1/082; F16L 55/1018
  See application file for complete search history.

(56) References Cited

U.S. PATENT DOCUMENTS

| | | | | |
|---|---|---|---|---|
| 3,139,932 A * | 7/1964 | Johnson | ................ | E21B 23/002 137/112 |
| 3,191,628 A * | 6/1965 | Kirkwood | ........... | F16K 11/0853 137/312 |
| 3,319,650 A * | 5/1967 | Peterson | ................ | B65G 53/56 137/561 R |
| 3,384,421 A * | 5/1968 | Flatt | ........................ | B65G 53/56 137/625.44 |
| 3,866,628 A * | 2/1975 | Weber | ................... | E21B 23/002 137/625.44 |
| 4,971,307 A * | 11/1990 | Killerud | ................ | F16L 41/023 138/172 |
| 5,265,547 A * | 11/1993 | Daws | ..................... | A01C 7/087 111/175 |
| 6,679,949 B2 * | 1/2004 | De Almeida | ......... | B08B 9/0551 134/22.11 |
| 2010/0065140 A1 * | 3/2010 | Joynson | ................. | B65G 51/24 137/625.44 |

* cited by examiner

*Primary Examiner* — Vicky Johnson
(74) *Attorney, Agent, or Firm* — Head, Johnson & Kachigian, P.C.

(57) ABSTRACT

A switch arm assembly for a piggable pipeline connector, the assembly comprising a switch arm and a handle assembly. The handle assembly comprises shaft connecting a handle with the switch arm and a stop to prevent the shaft from moving substantially away from the switch arm should the shaft become disconnected from the switch arm. The stop may comprise a shoulder in the shaft to prevent the shaft from exiting a housing, a bonnet over the top of the handle, or both.

7 Claims, 8 Drawing Sheets

SAFETY FEATURES FOR SWITCH HANDLE FOR PIGGABLE PIPELINE CONNECTOR

CROSS REFERENCE

Not Applicable.

BACKGROUND OF THE INVENTION

1. Field of the Invention

This invention relates generally to a switch arm for a pipeline connector, and more particularly, but not by way of limitation, to an easily manufactured switch arm and method of manufacturing the same.

2. Description of the Related Art

Devices known as pigs are often used to perform maintenance and for other purposes within pipelines while the pipelines are in use. Pigs have a difficult time negotiating a sharp bend in a pipeline, such as those that can occur at the junction of more than one pipeline. Thus, to be piggable, pipelines sometimes employ Y-shaped junctions rather than T-shaped junctions, making the change in direction a gradual curve rather than a sharp corner.

A switch arm is often attached at the junction between the two outward bound pipelines to allow a user to direct the pig along whichever pipeline he or she desires. The user may turn an attached handle to angle the switch arm to block off one of the pipelines, allowing the pig to travel along the second pipeline, or may turn the handle the other way to block off the second pipeline, allowing the pig to travel along the first.

The contents of the pipeline may be under significant pressure. Thus, if the handle assembly is damaged or otherwise fails, elements of the handle assembly may be launched from the pipeline and become a danger to people in the vicinity.

Based on the foregoing, it is desirable to provide a handle assembly with safety features to prevent elements of the handle assembly from being dislodged by the pressure within the pipeline should the handle assembly become damaged.

It is further desirable for the safety features to include a shoulder and/or a safety bonnet to act as a mechanical stop.

SUMMARY OF THE INVENTION

In general, in a first aspect, the invention relates to a switch arm assembly comprising a switch arm and a handle assembly. The handle assembly may comprise a shaft with a first end and an opposed second end, where the first end is connected to the switch arm, and a stop preventing the shaft from moving substantially away from the switch arm should the shaft become disconnected from the switch arm. The switch arm may be located within a piggable pipeline connector.

The switch arm assembly may further comprise a housing with a top, where the first end of the shaft is located inside the housing, the shaft extends through an opening in the top of the housing, and the second end of the shaft is located outside the housing. The stop may comprise a shoulder in the shaft, where the shoulder is located below the top of the housing and where the shaft below the shoulder has a diameter larger than the opening in the top of the housing. Additionally or alternately, the stop may comprise a bonnet comprising: a first leg attached to the top of the housing and extending away from the housing parallel to the shaft; a second leg attached to the top of the housing and extending away from the housing parallel to the shaft and to the second leg; and a cross piece connecting the first leg and the second leg beyond the second end of the shaft such that the bonnet straddles the second end of the shaft.

The top of the housing may comprise a seal block. The switch arm assembly may further comprise a retainer pin, where the shaft is connected to the switch arm via the retainer pin. The switch arm may further comprise a handle connected to the second end of the shaft, where the shaft is perpendicular to the switch arm and the handle is perpendicular to the shaft and parallel to the switch arm.

Figure 1:
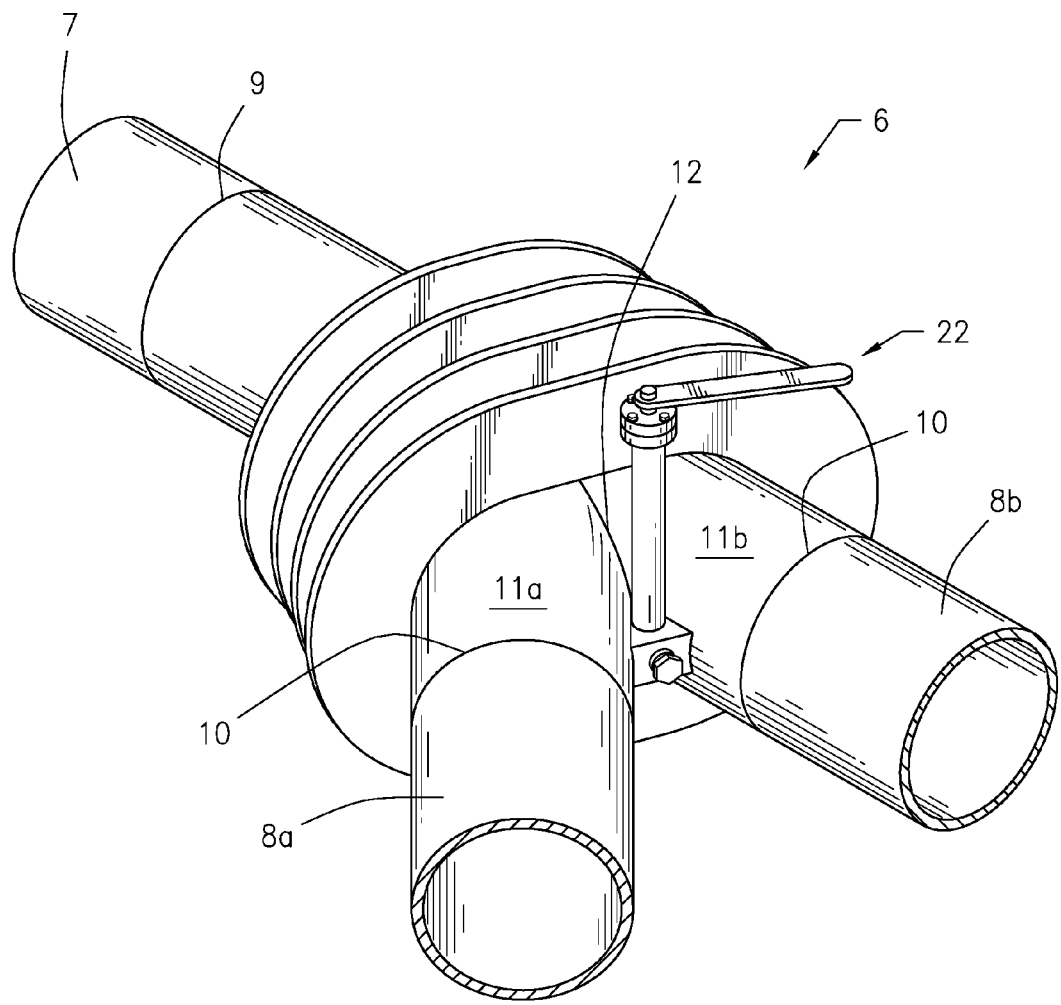
FIG. 1 is a perspective view of a piggable pipeline connector with a switch arm handle assembly.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to safety features for a handle assembly 100 for controlling a switch arm 1. The switch arm 1 may be located within a piggable pipeline connector 6, which may connect a single pipeline 7 to a plurality of pipelines 8, such as pipelines 8a and 8b as shown.

The connector 6 may be Y-shaped, as shown in the drawings, or any other shape connector desired. For example, two pipelines 8 may travel perpendicular in opposite directions relative to pipeline 7, one pipeline 8 may travel perpendicularly while another pipeline 8 continues in the same direction as pipeline 7, one or more pipelines 8 may travel at any desired angle relative to pipeline 7, two or more pipelines 8 may each travel at different angles relative to pipeline 7, or any other desired configuration or combination of configurations. In general, the contents may flow from the single pipeline 7 to the plurality of pipelines 8. The switch arm 1 may be used to direct a pig traveling through pipeline 7 into one particular pipeline 8.

The connector 6 may join pipeline 7 at a point 9 and pipelines 8 at points 10. Between points 9 and 10, the connector 6 may branch out from junction 12 into a plurality of legs 11, such as legs 11a and 11b as shown, each leg 11 leading toward one point 10. The connector 6 may be straight or may gradually curve from point 9 to each point 10, making the connector 6 fully piggable. The connector 6 may not have any 90° angles or any other sharp angles that would make passing a pig therethrough difficult or impossible.

The switch arm 1 may be elongate and may have a first end 20 and an opposed second end 21. The first end 20 may be located at junction 12, such that the switch arm 1 may block the entrance to either leg 11, depending on the position of the switch arm 1. The switch arm 1 may be pivotally connected to the connector 6 such that it may pivot between the two legs 11. The switch arm 1 may be connected at its first end 20 to a handle assembly 22, which the user may turn to change the position of the switch arm 1.

Figure 2:
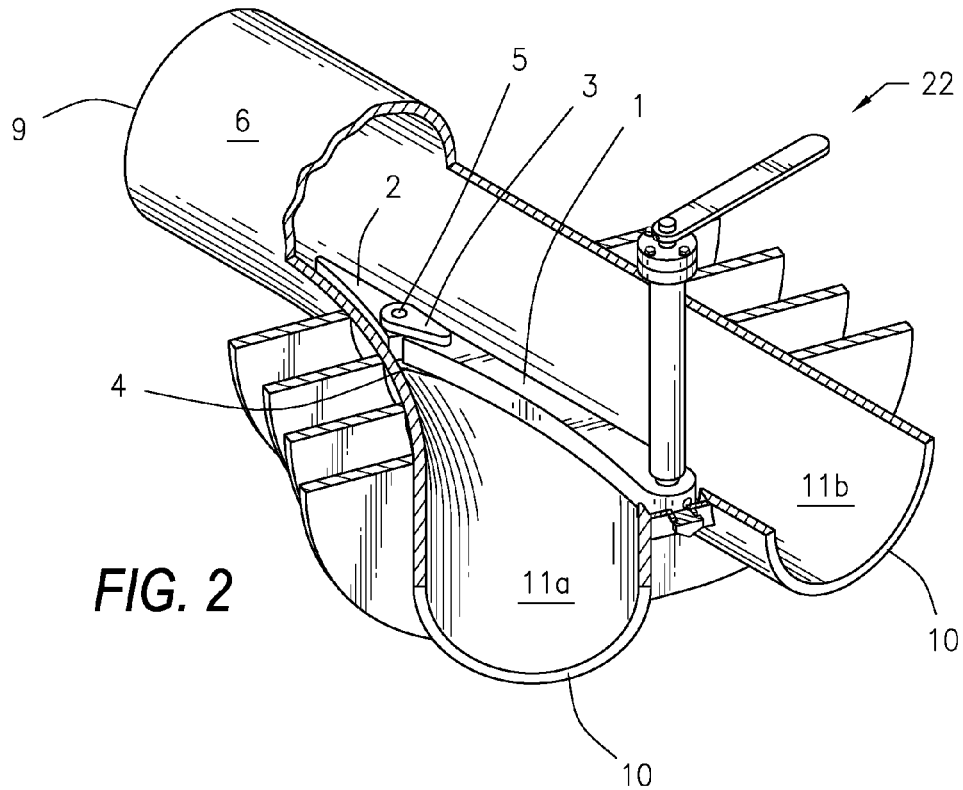
FIG. 2 is a cut away view of the piggable pipeline connector showing the switch arm and switch arm handle assembly, with the switch arm in a first position.
Figure 3:
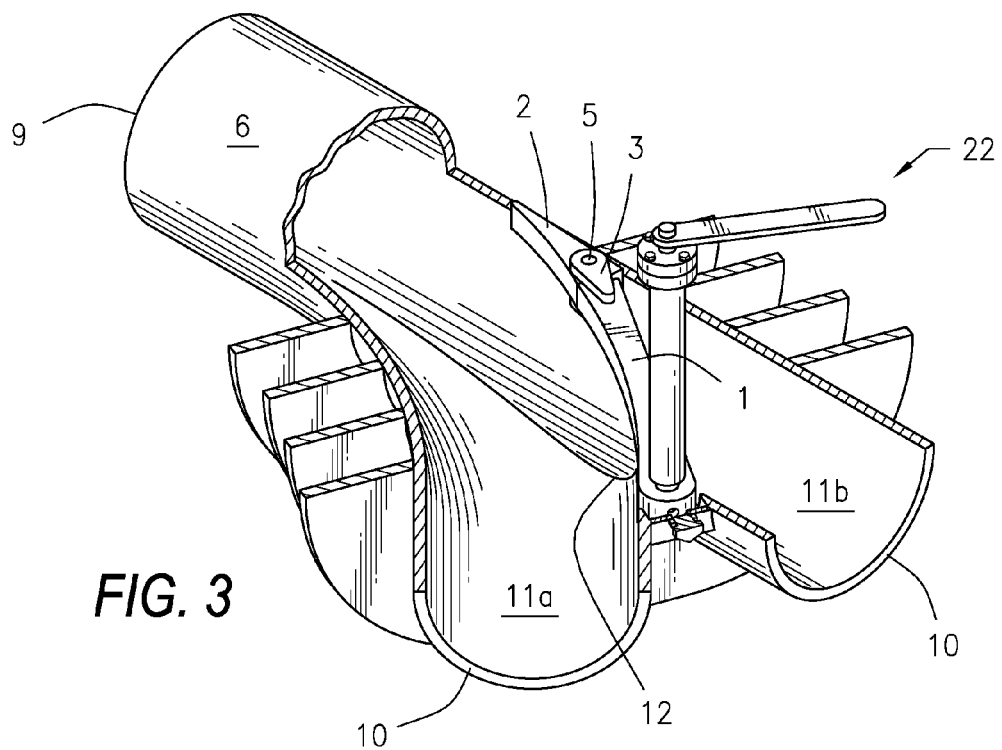
FIG. 3 is a cut away view of the piggable pipeline connector showing the switch arm and switch arm handle assembly, with the switch arm in a second position.
Figure 4:
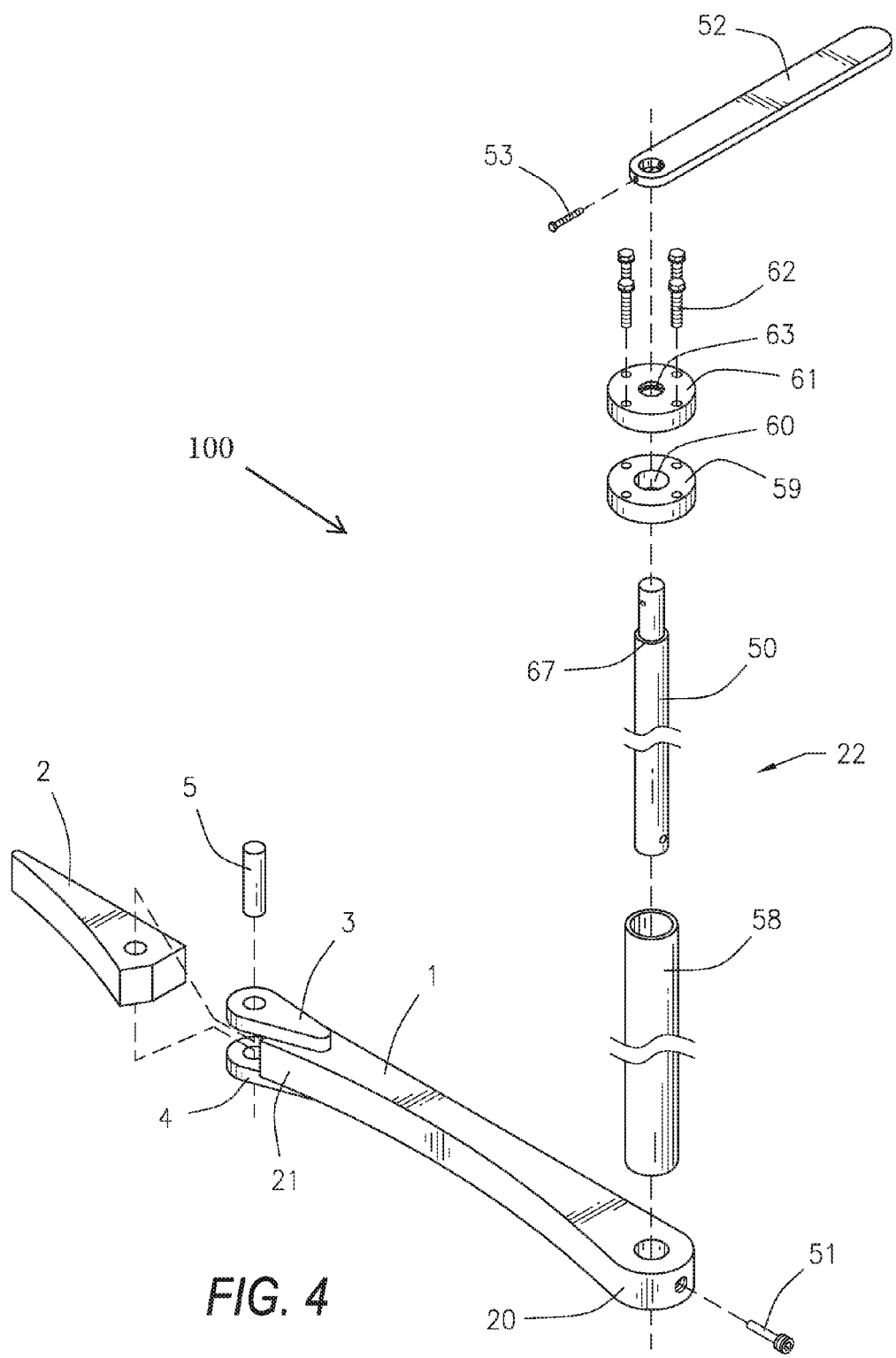
FIG. 4 is an exploded view of the switch arm and switch arm handle assembly.
Figure 5:
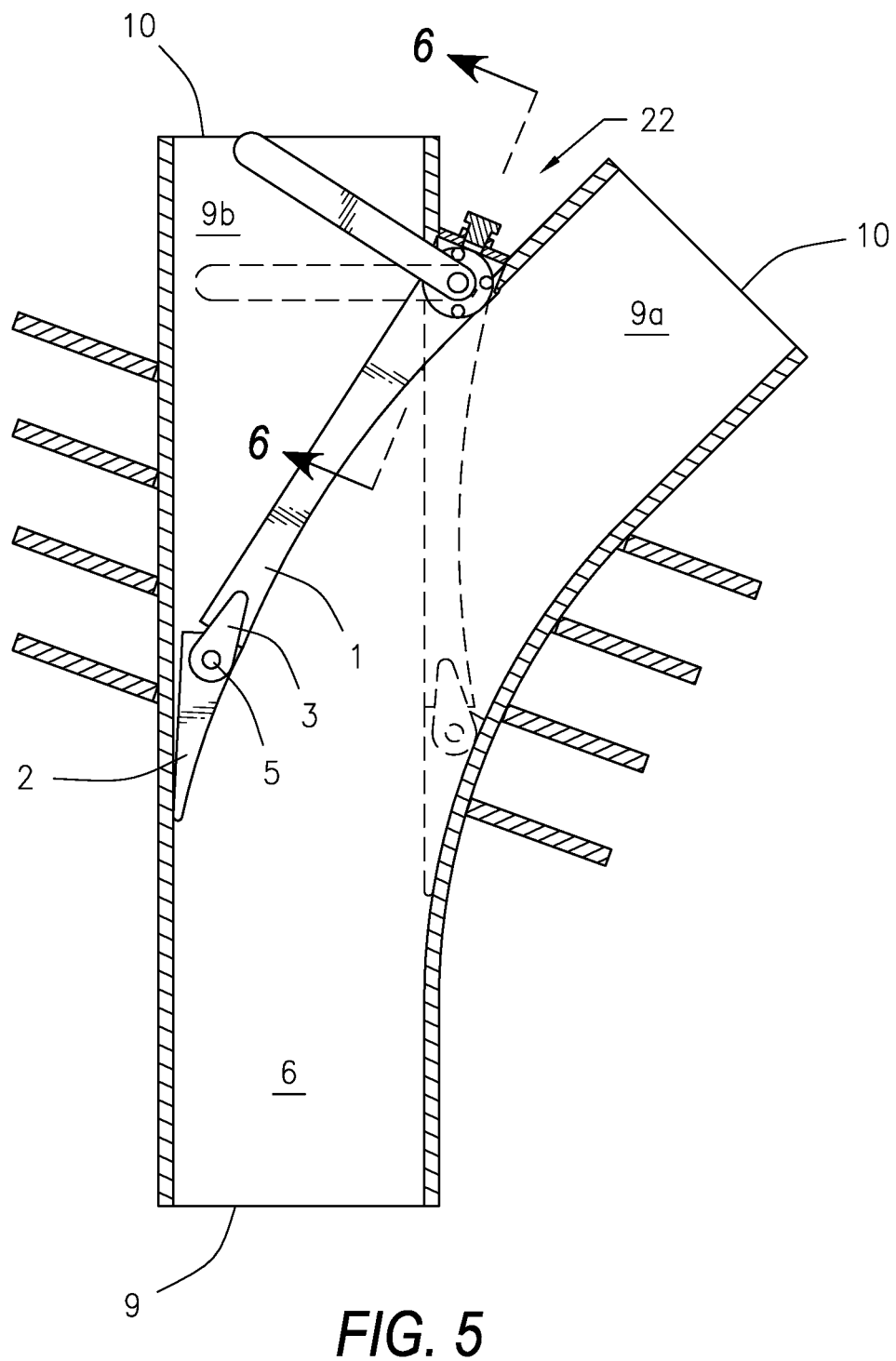
FIG. 5 is a top cross sectional view of the piggable pipeline connector showing the switch arm in the second position and showing the switch arm in the first position in dashed lines.
Figure 6:
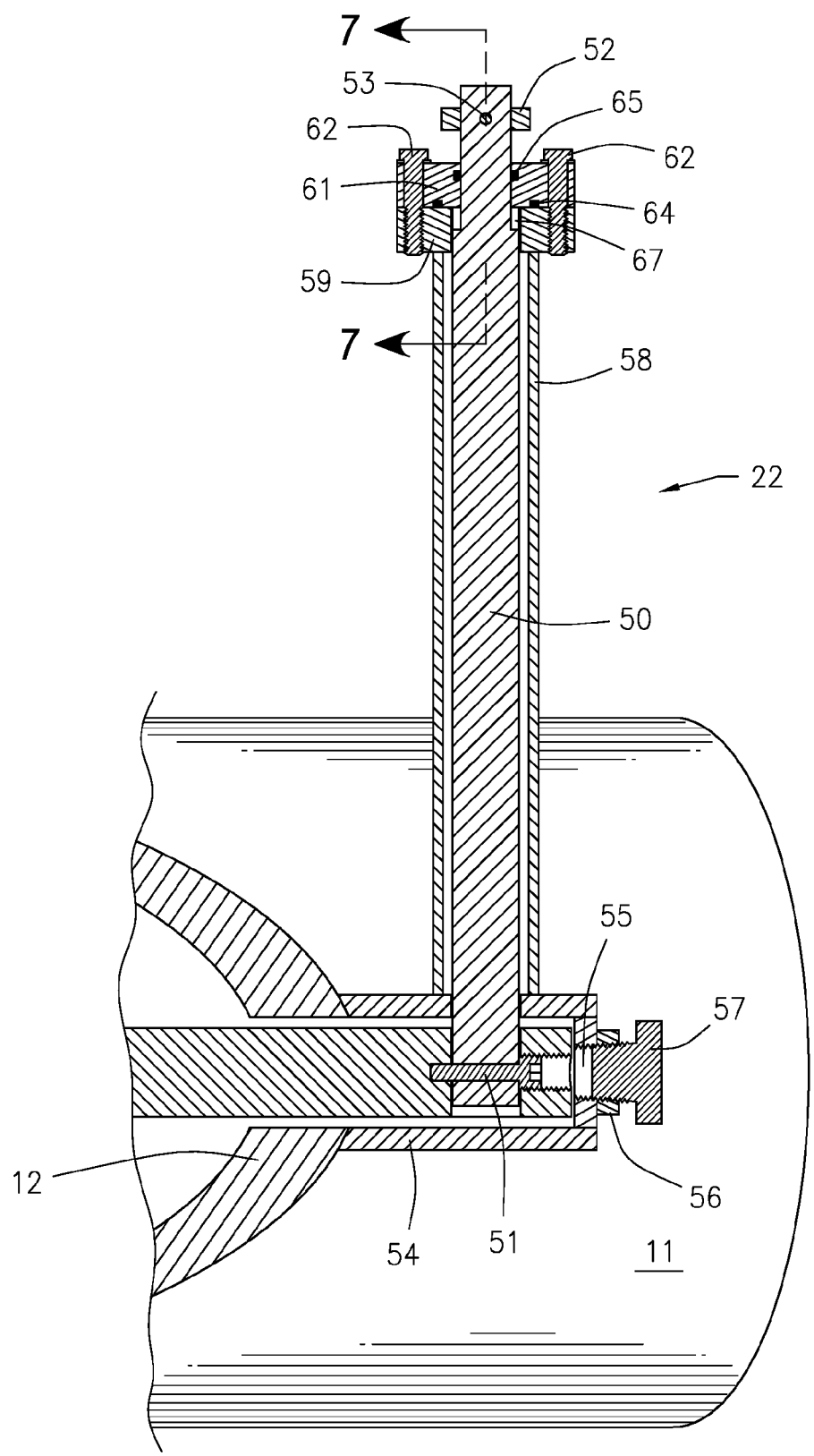
FIG. 6 is a side cross sectional view of the switch arm handle assembly in place on the piggable pipeline connector.
Figure 7:
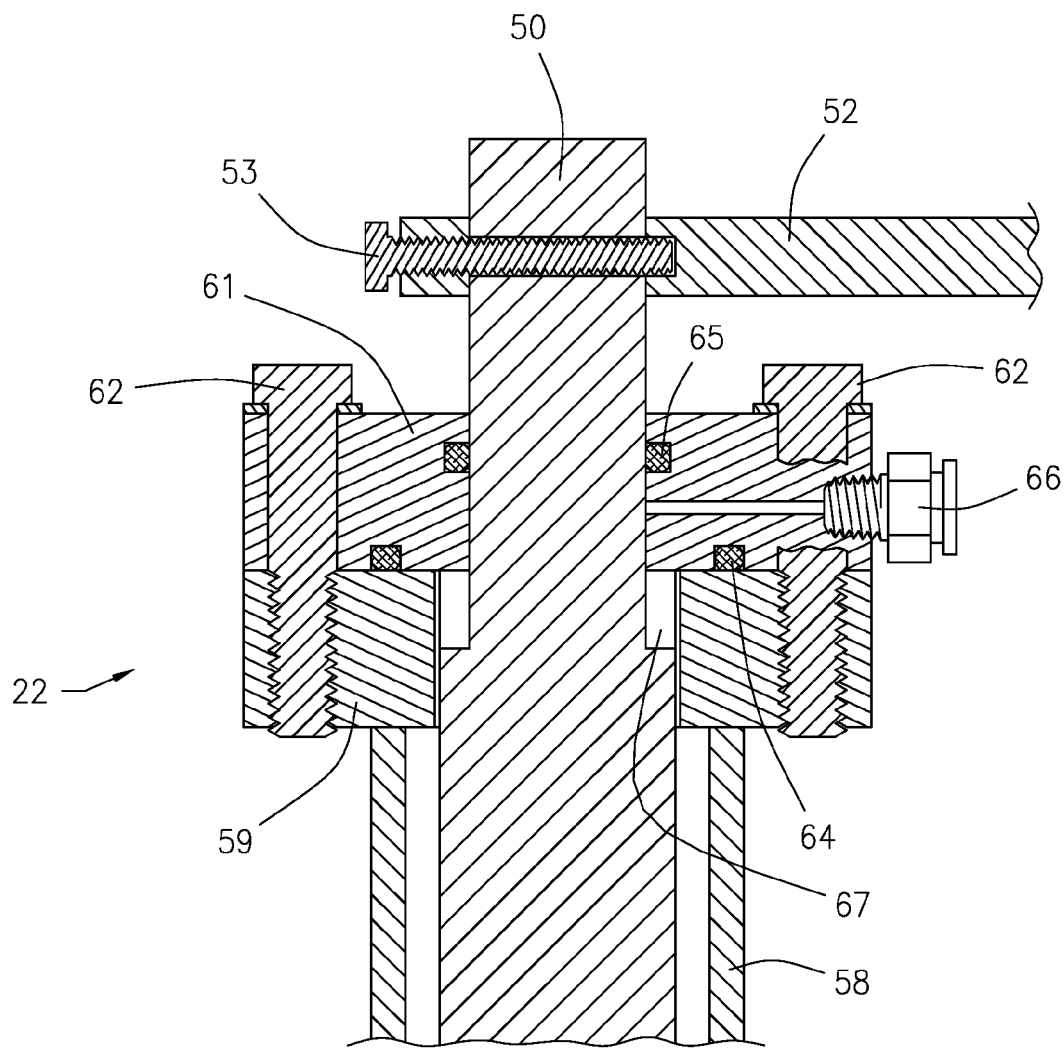
FIG. 7 is a cross sectional view of the top of the switch arm handle assembly.
Figure 8:
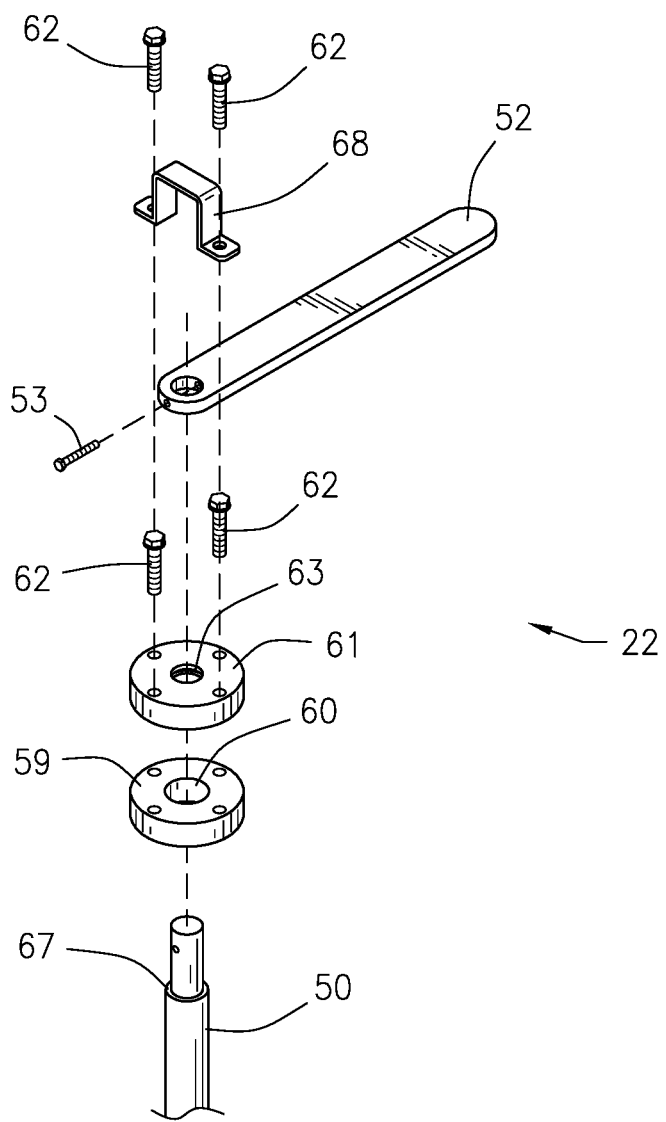
FIG. 8 is an exploded view of the top of the switch arm handle assembly with a safety bonnet.
Figure 9:
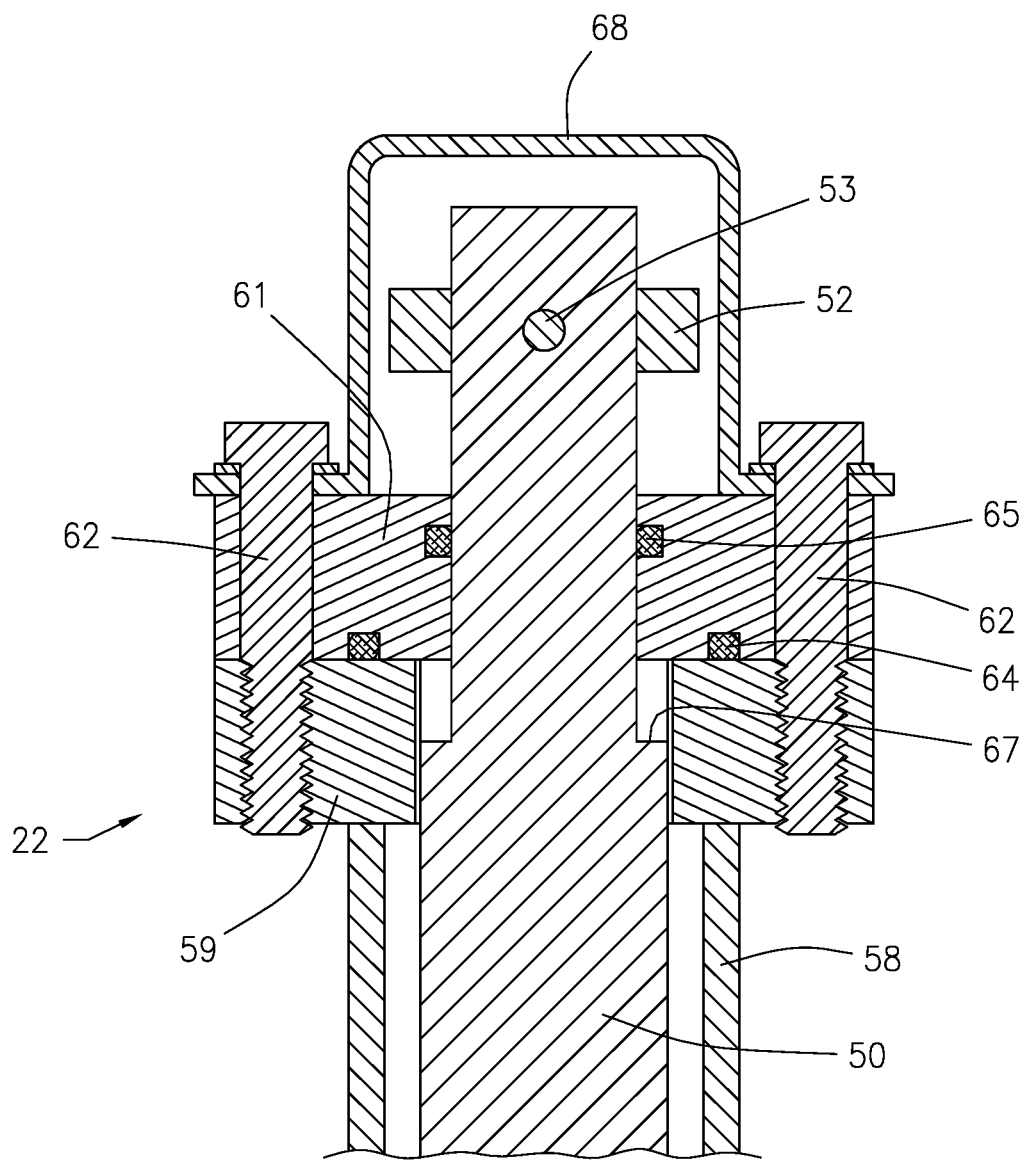
FIG. 9 is a cross sectional view of the top of the switch arm handle assembly with the safety bonnet in place.

The switch arm extension 2 may lie in the same plane as the switch arm 1. It may be pivotally connected to the second end 21 of the switch arm 1 via the plates 3 and 4 and pin 5 as shown in FIG. 4. The switch arm extension 2 may taper to a point or a rounded point and may rotate sufficiently that the side of the switch arm 1 and the side of the switch arm extension 2 form a generally smooth surface with no sharp angles or edges upon which the pig could become stuck, as seen in FIGS. 2, 3, and 5. The right side of the switch arm 1 and the right side of the switch arm extension 2 may curve and/or taper appropriately to match the general curvature of the left side of the inside wall of connector 6 as it transitions into the right leg 11 of connector 6. Thus, as seen in FIG. 3, the left side of the inside wall of connector 6, the right side of the switch arm extension 2, the right side of the switch arm 1, and the left side of the inside wall of the right leg 11 may all form a generally smooth surface with no sharp angles or edges upon which the pig could become stuck. Similarly, the left side of the switch arm 1 and the left side of the switch arm extension 2 may curve and/or taper appropriately to match the general curvature of the right side of the inside wall of connector 6 as it transitions into the left leg 11 of connector 6. Thus, as seen in FIG. 2, the right side of the inside wall of connector 6, the left side of the switch arm extension 2, the left side of the switch arm 1, and the right side of the inside wall of the left leg 11 may all form a generally smooth surface with no sharp angles or edges upon which the pig could become stuck. Both positions of the switch arm 1 and switch arm extension 2 are shown in FIG. 5.

The handle assembly 22 may comprise a shaft 50, which may connect to the switch arm 1 via a retainer pin 51 with a threaded head, or other attachment device. The shaft 50 may connect at its other end to a handle 52 via a screw 53 or other attachment device. Thus, turning the handle 52 may make the shaft 50 turn, which in turn may make the switch arm 1 pivot between the first position and the second position. The ends of the shaft 50 and switch arm 1 that connect together may be located within a housing 54 located at the junction 12. The housing 54 may have an opening 55 at its end. A half collar 56 may be mounted at the end of the housing 54 surrounding the opening 55 and a plug 57 may screw into the half collar 56, thus sealing off the opening 55.

The shaft 50 may extend upward out of the top of the housing 54. A shaft housing 58 may be attached to the top of the housing 54, such as by welding, and may extend upward, surrounding the shaft 50 for the height of the shaft housing 58. The shaft housing 58 may terminate in a base plate 59. The base plate 59 may be attached to the shaft housing 58, such as by welding, and may have a bore 60 therethrough. The shaft 50 may extend through the bore 60. A seal block 61 may be attached to the top of the base plate 59, such as via bolts 62 or other attachment devices. The seal block 61 may also have a bore 63 therethrough, where the bore 63 is coaxial with the bore 60. The shaft 50 may extend through the bore 63. The handle 52 may attach to the shaft 50 above the seal block 61. A seal 64, such as an O ring or other seal, may be located between the base plate 59 and the seal block 61, and another seal 65, such as an O ring or other seal, may be located within bore 63 between the seal block 61 and the shaft 50. A grease button 66 may allow for lubrication of the seals 64 and 65.

Bore 63 may have a smaller diameter than bore 60. The shaft 50 may have a shoulder 67 located below the seal block 61. The shaft 50 below the shoulder 67 may have a diameter greater than the diameter of bore 63 but less than the diameter of bore 60. The shaft 50 above the shoulder 67 may have a diameter less than the diameter of bore 63, provided the diameters of each and the diameter of the seal 65 are such that the shaft 50 may rotate within the bore 60 and the seal 65 but the interior of the handle assembly 22 is effectively sealed off.

The shoulder 67 may prevent the shaft 50 from traveling upward relative to the shaft housing 58 should the retainer pin 51 become damaged or otherwise ineffective. In the event of such a failure, the top of the shoulder 67 and the bottom of the seal block 61 may act as a mechanical stop to prevent a blowout due to pressure within the pipeline causing upward movement of the shaft 50 out of the shaft housing 58.

Additionally or alternately, a safety bonnet 68 may be attached to the top of the seal block 61 via one or more of the bolts 62 or other attachment devices. The safety bonnet 68 may extend upward on either side of the shaft 50 and across the end thereof, allowing room for the handle 52 to be turned but preventing the shaft 50 from traveling upward relative to the shaft housing 58 should the retainer pin 51 become damaged or otherwise ineffective. In the event of such a failure, the safety bonnet 68 may act as a mechanical stop. The shaft 50 may travel upward until its end hits the safety bonnet 68, and then may be prevented from further upward movement, thus preventing a blowout due to pressure within the pipeline causing upward movement of the shaft 50 out of the shaft housing 58.

Either the shoulder 67 or the safety bonnet 68 may be used as a mechanical stop to prevent upward movement of the shaft 50, or both the shoulder 67 and the safety bonnet 68 may be used together as redundant safety features. In particular, the safety bonnet 68 is suitable for retrofitting existing handle assemblies 22 as installation may require only removing two bolts 62, placing the safety bonnet 68 in place over the end of the shaft 50, and replacing the bolts 62 to secure the safety bonnet 68 in place relative to the seal block 61 and base plate 59.

Whereas, the devices and methods have been described in relation to the drawings and claims, it should be understood that other and further modifications, apart from those shown or suggested herein, may be made within the spirit and scope of this invention.

What is claimed is:

1. A switch arm assembly comprising:
   a switch arm;
   a handle assembly, the handle assembly comprising:
      a shaft with a first end and an opposed second end, where the first end is connected to the switch arm; and
      a stop preventing the shaft from moving substantially away from the switch arm should the shaft become disconnected from the switch arm; and
   a housing with a top, where the first end of the shaft is located inside the housing, the shaft extends through an opening in the top of the housing, and the second end of the shaft is located outside the housing;
   where the stop comprises a bonnet comprising:
      a first leg attached to the top of the housing and extending away from the housing parallel to the shaft;
      a second leg attached to the top of the housing and extending away from the housing parallel to the shaft and to the second leg, and;
      a cross piece connecting the first leg and the second leg beyond the second end of the shaft such that the bonnet straddles the second end of the shaft.

2. The switch arm assembly of claim 1 further comprising a piggable pipeline connector, where the switch arm is located within the piggable pipeline connector.

3. The switch arm of claim 1 where the stop comprises a shoulder in the shaft, where the shoulder is located below the top of the housing and where the shaft below the shoulder has a diameter larger than the opening in the top of the housing.

4. The switch arm assembly of claim 1 where the top of the housing comprises a seal block.

5. The switch arm assembly of claim 1 further comprising a retainer pin, where the shaft is connected to the switch arm via the retainer pin.

6. The switch arm of claim 1 further comprising a handle connected to the second end of the shaft, where the shaft is perpendicular to the switch arm and the handle is perpendicular to the shaft and parallel to the switch arm.

7. A switch arm assembly comprising:
   a switch arm;
   a handle assembly, the handle assembly comprising:
      a shaft with a first end and an opposed second end, where the first end is connected to the switch arm; and
      a stop preventing the shaft from moving substantially away from the switch arm should the shaft become disconnected from the switch arm; and
   a housing with a top, where the first end of the shaft is located inside the housing, the shaft extends through an opening in the top of the housing, and the second end of the shaft is located outside the housing;
   where the stop comprises a shoulder in the shaft and a bonnet, where the shoulder is located below the top of the housing and where the shaft below the shoulder has a diameter larger than the opening in the top of the housing, and where the bonnet comprises:
      a first leg attached to the top of the housing and extending away from the housing parallel to the shaft;
      a second leg attached to the top of the housing and extending away from the housing parallel to the shaft and to the second leg, and;
      a cross piece connecting the first leg and the second leg beyond the second end of the shaft such that the bonnet straddles the second end of the shaft.

* * * * *